(12) United States Patent
Zhu

(10) Patent No.: US 12,407,400 B2
(45) Date of Patent: Sep. 2, 2025

(54) COMMUNICATION METHOD AND DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co. Ltd., Beijing (CN)

( * ) Notice: Subject to any disclaimer, the term of this patent is extended or adjusted under 35 U.S.C. 154(b) by 127 days.

(21) Appl. No.: 18/560,284

(22) PCT Filed: May 10, 2021

(86) PCT No.: PCT/CN2021/092875
§ 371 (c)(1),
(2) Date: Nov. 10, 2023

(87) PCT Pub. No.: WO2022/236624
PCT Pub. Date: Nov. 17, 2022

(65) Prior Publication Data
US 2024/0243800 A1    Jul. 18, 2024

(51) Int. Cl.
*H04B 7/10* (2017.01)

(52) U.S. Cl.
CPC ...................... *H04B 7/10* (2013.01)

(58) Field of Classification Search
CPC ................. H04B 7/10; Y02D 30/70
See application file for complete search history.

(56) References Cited

U.S. PATENT DOCUMENTS

| 12,113,288 | B2* | 10/2024 | Dickey | ............. H01Q 21/24 |
| 2004/0264592 | A1* | 12/2004 | Sibecas | ............. H01Q 21/24 |
| | | | | 375/267 |
| 2009/0227260 | A1 | 9/2009 | Anreddy et al. | |
| 2025/0055504 | A1* | 2/2025 | Zhang | ............. H04B 7/10 |
| 2025/0070853 | A1* | 2/2025 | Liberg | ............. H04B 7/10 |

FOREIGN PATENT DOCUMENTS

| CN | 101577610 A | 11/2009 |
| CN | 105471484 A | 4/2016 |
| CN | 108988925 A | 12/2018 |
| CN | 110199554 A | 9/2019 |
| CN | 110350957 A | 10/2019 |
| CN | 112566195 A | 3/2021 |
| WO | WO 2021/058567 A1 | 4/2021 |

OTHER PUBLICATIONS

International Search Report Issued Feb. 10, 2022, in PCT/CN2021/092875, filed on May 10, 2021, 4 pages.
Combined Chinese Office Action and Search Report issued May 22, 2024, in corresponding Chinese Patent Application No. 202180001509.6 (with English Translation and English Translation of Category of Cited Documents), 20 pages.

* cited by examiner

*Primary Examiner* — Dac V Ha
(74) *Attorney, Agent, or Firm* — Oblon, McClelland, Maier & Neustadt, L.L.P.

(57) ABSTRACT

Disclosed in embodiments of the present disclosure is a communication method and device. The method performed by a terminal device includes: determining antenna polarization information, wherein the antenna polarization information is configured for indicating a time pattern corresponding to an antenna polarization mode of a network device; and determining a communication transmission mode according to the antenna polarization information and an antenna polarization mode of the terminal device.

20 Claims, 5 Drawing Sheets

Network device
11

Terminal device
12

COMMUNICATION METHOD AND DEVICE

CROSS-REFERENCE TO RELATED APPLICATIONS

The present application is a U.S. National Stage of International Application No. PCT/CN2021/092875, filed on May 10, 2021, the entire contents of which are incorporated herein by reference for all purposes.

TECHNICAL FIELD

The present disclosure relates to the field of communication technologies, and in particular, to a communication method and device.

BACKGROUND

In a communication system, when a terminal device communicates with a network device, and antenna polarization modes of the terminal device and the network device are the same, the communication and transmission can be carried out, so as to ensure the reliability of the communication and transmission. If the antenna polarization modes of the terminal device and the network device are not the same, the terminal device cannot be accessed to the communication system, which may not only affect the communication and transmission, but also bring about a large amount of energy consumption.

SUMMARY

The present disclosure provides a communication method and device, which may be applied in the field of communication technologies. The terminal device may determine a communication transmission mode based on antenna polarization information and an antenna polarization mode of the terminal device after determining the antenna polarization information, and perform communication and transmission.

In a first aspect, the present disclosure provides a communication method, performed by a terminal device, the method including: determining antenna polarization information, wherein the antenna polarization information is configured for indicating a time pattern corresponding to an antenna polarization mode of a network device; and determining a communication transmission mode according to the antenna polarization information and an antenna polarization mode of the terminal device.

In a second aspect, the present disclosure provides another communication method, performed by a network device, the method including: determining antenna polarization information, wherein the antenna polarization information is configured for indicating a time pattern corresponding to an antenna polarization mode of the network device; and performing communication and transmission according to the antenna polarization information.

In a third aspect, the present disclosure provides a communication device including a processor and a memory in which a computer program is stored. The processor executes the computer program stored in the memory to perform the method described in the first aspect.

In a fourth aspect, the present disclosure provides a communication device including a processor and a memory in which a computer program is stored. The processor executes the computer program stored in the memory to perform the method described in the second aspect.

BRIEF DESCRIPTION OF THE DRAWINGS

In order to more clearly illustrate the technical solutions in the embodiments or background of the present disclosure, the accompanying drawings to be used in the embodiments or background of the present disclosure are described below.

DETAILED DESCRIPTION

For ease of understanding, the terminology involved in this disclosure is first introduced.
1. Antenna Polarization The instantaneous direction of the electric field vector of an electromagnetic wave radiated by an antenna as it travels through space is called "polarization". Thus, antenna polarization can be divided into linear polarization, circular polarization, elliptical polarization and so on. Among them, circular polarization can be divided into left hand circulate polarization (LHCP) and right hand circulate polarization (RHCP).

In order to better understand a communication method disclosed by embodiments of the present disclosure, a communication system to which embodiments of the present disclosure is applicable is first described below.

Figure 1:
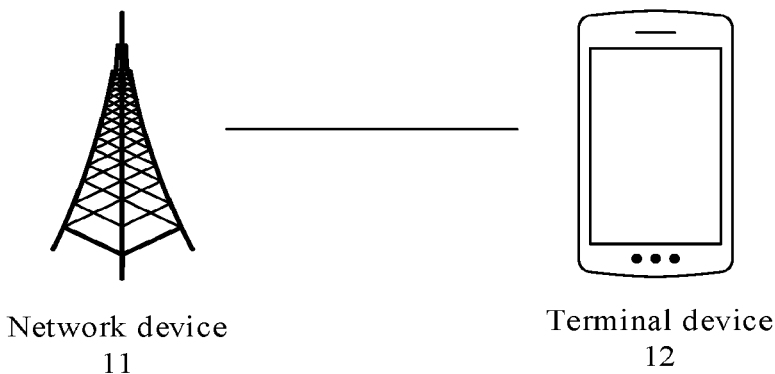
FIG. 1 is a schematic diagram of architecture of a communication system provided by embodiments of the present disclosure.

Referring to FIG. 1, FIG. 1 shows a schematic diagram of architecture of a communication system provided by embodiments of the present disclosure. The communication system may include, but is not limited to, a network device and a terminal device. The number and form of the devices shown in FIG. 1 are for example only and do not constitute a limitation of the embodiments of the present disclosure, and two or more network devices, and two or more terminal devices may be included in practical applications. The communication system shown in FIG. 1 includes, for example, one network device 11 and one terminal device 12.

It is to be noted that the technical solutions of the embodiments of the present disclosure can be applied to various communication systems. For example, a long term evolution (LTE) system, a 5th generation (5G) mobile communication system, a 5G new radio (NR) system, or other future new mobile communication systems.

The network device 11 in the embodiments of the present disclosure is an entity on the network side for transmitting or receiving signals. For example, the network device 11 may be an evolved NodeB (eNB), a transmission reception point (TRP), a next generation NodeB (gNB) in an NR system, a base station in other future mobile communication systems, or an access point in a wireless fidelity (Wi-Fi) system, etc. The embodiments of the present disclosure do not limit the specific technology and the specific device form used for the network device. The network device provided by embodiments of the present disclosure may be composed of a central unit (CU) and a distributed unit (DU), wherein the CU may also be called a control unit. The CU-DU structure may be used to split the protocol layer of a network device, such as a base station, so that some of functions of the protocol layer are placed in the CU for centralized control, while the rest or all of the functions of the protocol layer are distributed in the DU, which is centrally controlled by the CU.

The terminal device 12 in the embodiments of the present disclosure is an entity on the user side for receiving or transmitting signals, such as a cell phone. The terminal device may also be referred to as a terminal, user equipment (UE), mobile station (MS), mobile terminal (MT), and the like. The terminal device may be a car with communication functions, an intelligent car, a mobile phone, a wearable device, a tablet computer (Pad), a computer with wireless transceiver functions, a virtual reality (VR) terminal device, an augmented reality (AR) terminal device, a wireless terminal device for industrial control, a wireless terminal device for self-driving, a wireless terminal device for remote medical surgery, a wireless terminal device for smart grid, a wireless terminal device for transportation safety, a wireless terminal device in smart city, a wireless terminal device in smart home, and so on. The embodiments of the present disclosure do not limit the specific technologies and specific equipment forms used for the terminal devices.

It is to be understood that the communication system described in the embodiments of the present disclosure is intended to more clearly illustrate the technical solutions of the embodiments of the present disclosure and does not constitute a limitation of the technical solutions provided by the embodiments of the present disclosure, and a person of ordinary skill in the art may know that, with the evolution of the system architecture and the emergence of new business scenarios, the technical solutions provided by the embodiments of the present disclosure are equally applicable to similar technical problems.

The communication method and apparatus provided by the present disclosure are described in detail below in connection with the accompanying drawings.

Figure 2:
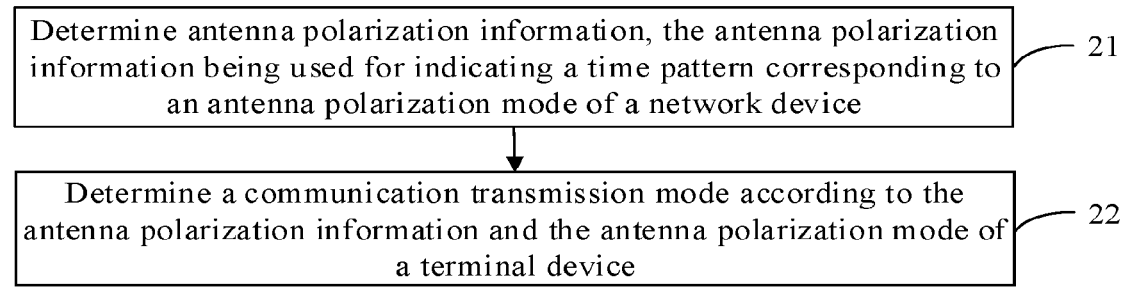
FIG. 2 is a flow diagram of a communication method provided by an embodiment of the present disclosure.

Referring to FIG. 2, FIG. 2 is a flow diagram of a communication method provided by an embodiment of the present disclosure. This method is performed by a terminal device. As shown in FIG. 2, the method may include, but is not limited to, the following steps.

Step 21, determining antenna polarization information, wherein the antenna polarization information is configured for indicating a time pattern corresponding to an antenna polarization mode of a network device.

The time pattern corresponding to the antenna polarization mode of the network device may reflect the antenna polarization modes of the network device in different time periods or at different moments in time, and the present disclosure is not limited thereto.

In addition, there may be various antenna polarization modes for the network device, such as left hand circulate polarization, or right hand circulate polarization, or circular polarization (i.e., with both the left hand circulate polarization and right hand circulate polarization), etc., and the present disclosure is not limited thereto.

Optionally, the terminal device may determine the antenna polarization information based on a protocol agreement.

For example, the protocol agreement is that the antenna polarization mode of the network device changes every 10 seconds starting from moment t, and that from the $0^{th}$ to the $10^{th}$ second, the antenna polarization mode of the network device is the left hand circulate polarization, and from the $10^{th}$ to the $20^{th}$ second, the antenna polarization mode of the network device is the right hand circulate polarization. Thereby, if the current moment is $(t+25)^{th}$ second, the terminal device may determine that the current antenna polarization mode of the network device is the left hand circulate polarization according to the protocol agreement.

It is to be noted that the above example is merely illustrative and is not to be taken as a limitation of the antenna polarization information and the like in the embodiments of the present disclosure.

Optionally, the terminal device may also determine the antenna polarization information and the like based on indications from the network device, which is not limited by the present disclosure.

Step 22, determining a communication transmission mode according to the antenna polarization information and an antenna polarization mode of the terminal device.

It is to be understood that when the antenna polarization mode of the terminal device and the antenna polarization mode of the network device are consistent within a certain time period, the terminal device and the network device can perform communication and transmission within that time period. When the antenna polarization mode of the terminal device and the antenna polarization mode of the network device are inconsistent within a certain time period, the terminal device and the network device cannot perform communication and transmission within that time period.

For example, the antenna polarization information of the network device is determined as follows: starting from moment t, the antenna polarization mode of the network device changes every 10 seconds, and from the $0^{th}$ to the $10^{th}$ second, the antenna of the network device is in the left hand circulate polarization mode, and from the $10^{th}$ to the $20^{th}$ second, the antenna of the network device is in the right hand circulate polarization mode. In addition, the antenna polarization mode of the terminal device is the left hand circulate polarization.

In this case, the terminal device may determine that, starting from the moment t, at the $0^{th}$ to $10^{th}$ second, the $20^{th}$ to $30^{th}$ second, the $40^{th}$ to $50^{th}$ second, and so on, the antenna polarization mode of the terminal device and the antenna polarization mode of the network device are consistent, and the terminal device and the network device can perform the communication and transmission. During the time period when the antenna polarization modes of the terminal device and the network device are inconsistent, the terminal device and the network device cannot perform communication and transmission, and the terminal device no longer monitors the network information, thereby not only ensuring the reliability of the communication and transmission of the terminal device, but also reducing the energy consumption of the terminal device.

By implementing this embodiment of the present disclosure, the terminal device may first determine the antenna polarization information, and then determine the communication transmission mode according to the antenna polarization information and the antenna polarization mode of the terminal device, and perform the communication and transmission. In this way, not only the reliability of the communication and transmission between the terminal device and the network device is ensured, but also the consumption of energy of the terminal device is reduced.

Figure 3:
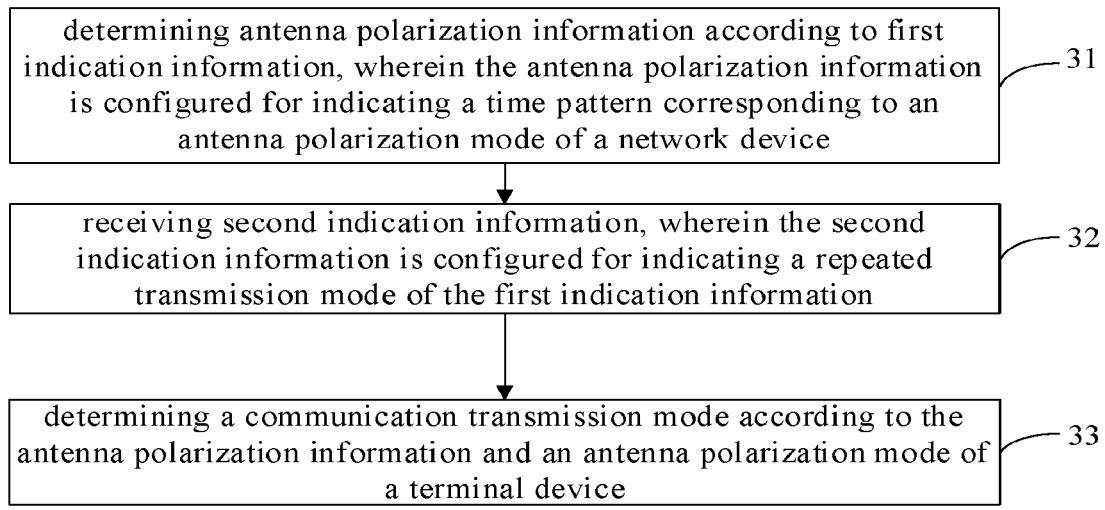
FIG. 3 is a flow diagram of a communication method provided by another embodiment of the present disclosure.

Referring to FIG. 3, FIG. 3 is a flow diagram of a communication method provided by an embodiment of the present disclosure. This method is performed by a terminal device. As shown in FIG. 3, the method may include, but is not limited to, the following steps.

Step 31, determining antenna polarization information according to first indication information, wherein the antenna polarization information is configured for indicating a time pattern corresponding to an antenna polarization mode of a network device.

The terminal device may receive the first indication information sent by the network device, and thereafter determine the antenna polarization information according to the indication of the first indication information.

For example, the first indication information indicates that at the moment t1 to the moment t2, the antenna polarization mode of the network device is the left hand circulate polarization, and at the moment t2 to the moment t3, the antenna polarization mode of the network device is the right hand circulate polarization. Thereby, the terminal device may determine the antenna polarization information of the network device according to the indication of the first indication information, and so on, and the present disclosure is not limited thereto.

Optionally, the first indication information may be any one of: a synchronization signal block (SSB), system information, a random access message, or a media access control (MAC) control element (CE), etc., and the present disclosure is not limited thereto.

For example, if the first indication information is the system information, a protocol agreement may be made in advance in which a value of a specific bit may be taken to characterize the antenna polarization information of the network device. Thereby, the terminal device, after receiving the system information sent by the network device, may determine the antenna polarization mode of the network device based on the value of the specific bit according to the agreement, and so on, without limitation of the present disclosure.

Step 32, receiving second indication information, wherein the second indication information is configured for indicating a repeated transmission mode of the first indication information.

The terminal device may first receive the second indication information sent by the network device, and thereafter determine the repeated transmission mode corresponding to the first indication information according to the indication of the second indication information.

For example, the second indication information received by the terminal device indicates that the first indication information is repeatedly sent every 30 seconds. Thereby, the terminal device may determine, based on the indication of the second indication information, that the network device repeatedly sends the first indication information every 30 seconds. The present disclosure does not limit this.

Optionally, the terminal device may be informed of the repeated transmission mode of the first indication information based on the indication of the second indication information, so that the terminal device may receive the first indication information at a corresponding time, reducing the consumption of energy of the terminal device.

It is to be noted that step 31 may be performed first, followed by step 32, or alternatively step 32 may be performed first, followed by step 31, and so on, and the present disclosure is not limited thereto.

Step 33, determining a communication transmission mode according to the antenna polarization information and an antenna polarization mode of the terminal device.

Optionally, the terminal device may perform communication and transmission during a time period in which the antenna polarization mode of the terminal device is consistent with the antenna polarization mode of the network device; while during a time period in which the antenna polarization mode of the terminal device is inconsistent with the antenna polarization mode of the network device, the terminal device and the network device cannot perform communication and transmission, so the terminal device no longer monitors the network information, thereby not only guaranteeing the reliability of the communication and transmission of the terminal device, but also reducing the consumption of energy of the terminal device.

It is to be noted that the specific contents and realization of step 33 can be described with reference to various other embodiments of the present disclosure and will not be repeated herein.

By implementing this embodiment of the present disclosure, the terminal device may determine the antenna polarization information according to the first indication information, and thereafter also receive the second indication information to determine the repeated transmission mode of the first indication information, and then determine the communication transmission mode according to the antenna polarization information and the antenna polarization mode of the terminal device, so as to realize the communication and transmission with the network device. In this way, not only the reliability of the communication and transmission between the terminal device and the network device is ensured, but also the consumption of energy of the terminal device is reduced.

Figure 4:
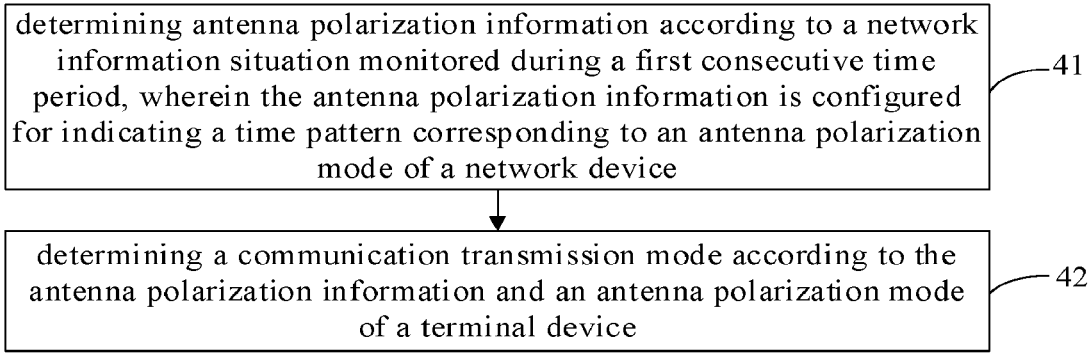
FIG. 4 is a flow diagram of a communication method provided by yet another embodiment of the present disclosure.

Referring to FIG. 4, FIG. 4 is a flow diagram of a communication method provided by an embodiment of the present disclosure. This method is performed by a terminal device. As shown in FIG. 4, the method may include, but is not limited to, the following steps.

Step 41, determining antenna polarization information according to a network information situation monitored during a first consecutive time period, wherein the antenna polarization information is configured for indicating a time pattern corresponding to an antenna polarization mode of a network device.

The first consecutive time period may be a time period of a fixed duration set in advance, wherein the duration corresponding to the first consecutive time period may be determined according to a protocol agreement, or according to indications from the network, for example, it may be 13 s, 30 s, and so on.

It is to be understood that the duration of the first consecutive time period is, in order to ensure the reliability of the monitoring of the terminal device, usually longer than the period of the switching of the antenna polarization mode of the network device.

Optionally, if there is network information monitored by the terminal device during the first consecutive time period, it can be determined that the antenna polarization mode of the network device is the same as the antenna polarization mode of the terminal device.

For example, if there is network information monitored by the terminal device during the first consecutive time period and the antenna polarization mode of the terminal device is the right hand circulate polarization, it can be determined that the antenna polarization mode of the network device is the same as the antenna polarization mode of the terminal device, which is also the right hand circulate polarization, etc., without limitation of the present disclosure.

Optionally, the terminal device may also determine that the antenna polarization mode of the network device is the same as the antenna polarization mode of the terminal device during a time period in which the network information is monitored.

For example, if the antenna polarization mode of the terminal device is the left hand circulate polarization and there is network information monitored during a time period A in the first consecutive time period, it can be determined that the antenna polarization mode of the network device is the same as the antenna polarization mode of the terminal device during the time period A, which is also the left hand circulate polarization, and so on, without limitation of the present disclosure.

Step 42, determining a communication transmission mode according to the antenna polarization information and an antenna polarization mode of the terminal device.

Optionally, the terminal device may perform communication and transmission during a time period in which the antenna polarization mode of the terminal device is consistent with the antenna polarization mode of the network device; while during a time period in which the antenna polarization modes of the terminal device and the network device are inconsistent, the terminal device and the network device cannot perform communication and transmission, so the terminal device no longer monitors the network information, thereby not only ensuring the reliability of the communication and transmission of the terminal device, but also reducing the consumption of energy of the terminal device.

It is to be noted that the specific contents and realization of step 42 can be described with reference to the description of various other embodiments of the present disclosure and will not be repeated herein.

By implementing this embodiment of the present disclosure, the terminal device may determine the antenna polarization information according to the network information situation monitored during the first consecutive time period, and then determine the communication transmission mode according to the antenna polarization information and the antenna polarization mode of the terminal device, thereby realizing the communication and transmission with the network device. In this way, not only the reliability of the communication and transmission between the terminal device and the network device is ensured, but also the consumption of energy of the terminal device is reduced.

Figure 5:
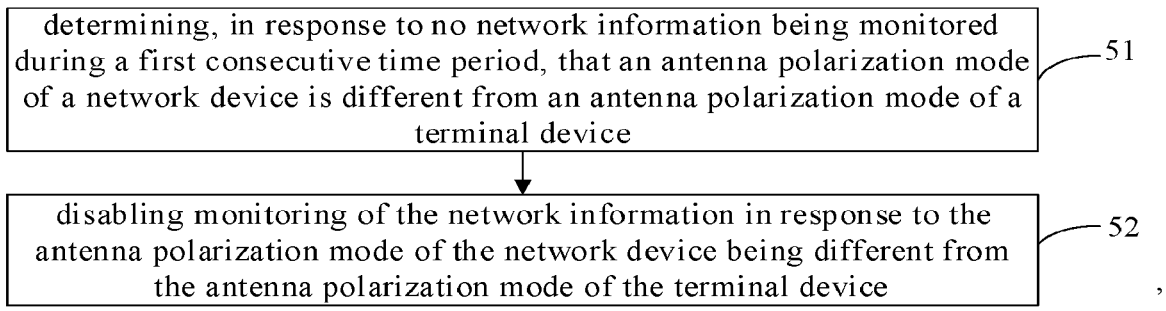
FIG. 5 is a flow diagram of a communication method provided by still another embodiment of the present disclosure.

Referring to FIG. 5, FIG. 5 is a flow diagram of a communication method provided by an embodiment of the present disclosure. The method is performed by a terminal device. As shown in FIG. 5, the method may include, but is not limited to, the following steps.

Step 51, determining, in response to no network information being monitored during the first consecutive time period, that the antenna polarization mode of the network device is different from the antenna polarization mode of the terminal device.

For example, if the antenna polarization mode of the terminal device is the left hand circulate polarization and no network information is monitored by the terminal during the first consecutive time period, it can be determined that the antenna polarization mode of the network device is different from the antenna polarization mode of the terminal device, e.g., the antenna polarization mode of the network device may be the right hand circulate polarization and so on, and the present disclosure is not limited thereto.

It is to be understood that the duration of the first consecutive time period is, in order to ensure the reliability of the monitoring of the terminal device, usually longer than the period of the switching of the antenna polarization mode of the network device.

Step 52, disabling monitoring of the network information in response to the antenna polarization mode of the network device being different from the antenna polarization mode of the terminal device.

It is to be understood that the terminal device may stop monitoring the network information in the case where the antenna polarization mode of the network device is different from the antenna polarization mode of the terminal device and the terminal device and the network device cannot perform communication and transmission, thereby reducing the energy loss of the terminal device and saving resources.

By implementing this embodiment of the present disclosure, the terminal device may stop monitoring the network information after no network information is monitored during the first consecutive time period and it is determined that the antenna polarization mode of the network device is different from the antenna polarization mode of the terminal device. In this way, not only the reliability of the communication and transmission between the terminal device and the network device is ensured, but also the consumption of energy of the terminal device is reduced.

Figure 6:
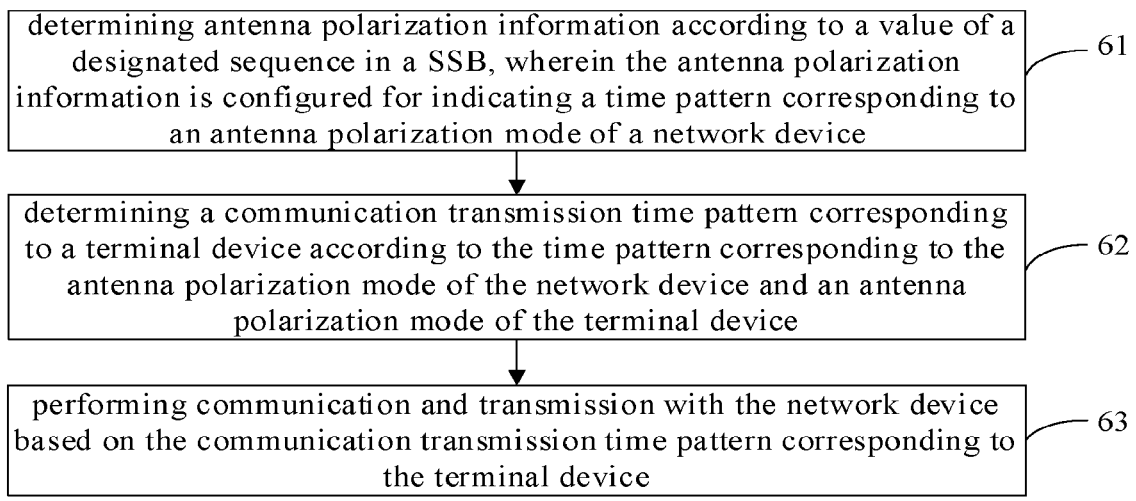
FIG. 6 is a flow diagram of a communication method provided by still another embodiment of the present disclosure.

Referring to FIG. 6, FIG. 6 is a flow diagram of a communication method provided by an embodiment of the present disclosure. This method is performed by a terminal device. As shown in FIG. 6, the method may include, but is not limited to, the following steps.

Step 61, determining antenna polarization information according to a value of a designated sequence in a SSB, wherein the antenna polarization information is configured for indicating a time pattern corresponding to an antenna polarization mode of a network device.

The designated sequence may be agreed upon by the protocol, or may be configured by a network device, etc., without limitation of the present disclosure.

For example, the corresponding relationship between the value of the designated sequence in the SSB and the antenna polarization information corresponding to the network device can be agreed in advance.

For example, it is agreed that a value of a designated sequence in the SSB is 1 and it characterizes that the antenna polarization mode corresponding to the network device is the left hand circulate polarization; and a value of a designated sequence in the SSB is 0 and it characterizes that the antenna polarization mode corresponding to the network device is the right hand circulate polarization. Thereby, if the value of the designated sequence in the SSB received by the terminal device is 0, it can be determined that the antenna polarization mode corresponding to the network device is the right hand circulate polarization, etc., and the present disclosure is not limited thereto.

Step 62, determining a communication transmission time pattern corresponding to the terminal device according to the time pattern corresponding to the antenna polarization mode of the network device and an antenna polarization mode of the terminal device.

The communication transmission time pattern corresponding to the terminal device may reflect the various times at which the terminal device may perform the communication and transmission and the corresponding antenna polarization modes.

For example, the antenna polarization mode of a network device is as follows: starting from moment t, the antenna of the network device is in the left hand circulate polarization mode from the $0^{th}$ to the $10^{th}$ second; the antenna of the network device is in the right hand circulate polarization mode from the $10^{th}$ to the $20^{th}$ second; and the antenna of the network device is in the left hand circulate polarization mode from the $20^{th}$ to the $30^{th}$ second, and so on, i.e., the antenna polarization mode of the network device is changed once in every 10 seconds.

In addition, the antenna polarization mode of the terminal device is the left hand circulate polarization, whereby the corresponding communication transmission time pattern of the terminal device may be determined as follows: starting from moment t, the antenna polarization modes of the terminal device and the network device are the same from the $0^{th}$ to the $10^{th}$ second, and the communication and transmission can be performed; the antenna polarization modes of the terminal device and the network device are not the same from the $10^{th}$ to the $20^{th}$ second, and the communication and transmission are not performed; and from the $20^{th}$ to the $30^{th}$ second, the communication and transmission can be performed, and so on, i.e., every 10 seconds, the communication and transmission can be performed, etc., and the present disclosure is not limited thereto.

Step 63, performing communication and transmission with the network device based on the communication transmission time pattern corresponding to the terminal device.

It is to be understood that the terminal device may, according to the corresponding communication transmission time pattern, perform communication and transmission with the network device during a time period in which the communication and transmission can be performed, while the terminal device no longer monitors the network information during a time period in which the antenna polarization modes of the terminal device and the network device are inconsistent and the terminal device and the network device cannot perform the communication and transmission. In this way, not only the reliability of the communication and transmission between the terminal device and the network device is ensured, but also the consumption of energy of the terminal device is reduced.

By implementing this embodiment of the present disclosure, the terminal device may first determine the antenna polarization information according to the value of the designated sequence in the SSB, and thereafter, determine the corresponding communication transmission time pattern of the terminal device according to the time pattern corresponding to the antenna polarization mode of the network device and the antenna polarization mode of the terminal device, so that the communication and transmission can be conducted with the network device based on the corresponding communication transmission time pattern of the terminal device. In this way, not only the reliability of the communication and transmission between the terminal device and the network device is ensured, but also the consumption of energy of the terminal device is reduced.

Figure 7:
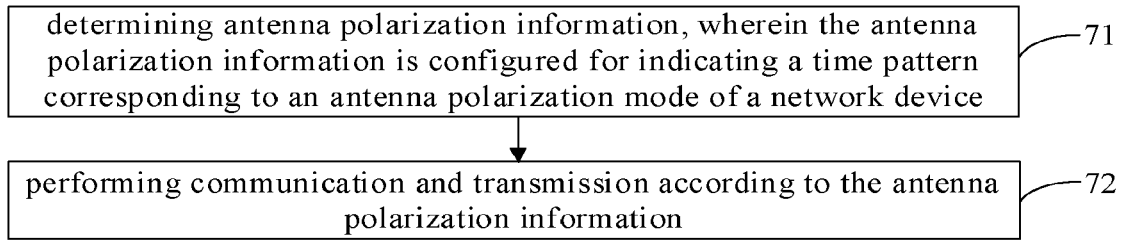
FIG. 7 is a flow diagram of a communication method provided by still another embodiment of the present disclosure.

Referring to FIG. 7, FIG. 7 is a flow diagram of a communication method provided by an embodiment of the present disclosure. This method is performed by a network device. As shown in FIG. 7, the method may include, but is not limited to, the following steps.

Step 71, determining antenna polarization information, wherein the antenna polarization information is configured for indicating a time pattern corresponding to an antenna polarization mode of the network device.

The time pattern corresponding to the antenna polarization mode of the network device may reflect the antenna polarization modes of the network device in different time periods or at different moments in time, and the present disclosure is not limited thereto.

In addition, there may be various antenna polarization modes for the network device, such as left hand circulate polarization, or right hand circulate polarization, or both the left hand circulate polarization and right hand circulate polarization, etc., and the present disclosure is not limited thereto.

Optionally, the network device may determine the antenna polarization information based on a protocol agreement.

For example, the protocol agreement is that the antenna polarization mode of the network device changes every 10 seconds starting from moment t, and that from the $0^{th}$ to the $10^{th}$ second, the antenna of the network device is in the left hand circulate polarization mode, and from the $10^{th}$ to the $20^{th}$ second, the antenna of the network device is in the right hand circulate polarization mode. Thereby, the network device may determine the antenna polarization information of the network device according to the protocol agreement.

It is to be noted that the above example is merely illustrative and is not to be taken as a limitation of the antenna polarization information and the like in the embodiments of the present disclosure.

Optionally, the network device may also determine the antenna polarization information and the like according to a pre-configuration, which is not limited by the present disclosure.

Step 72, performing communication and transmission according to the antenna polarization information.

It is to be understood that the network device may perform the communication and transmission with the terminal device at a corresponding time according to the time pattern corresponding to the antenna polarization mode of the network device indicated by the antenna polarization information. In this way, not only the reliability of the communication and transmission between the terminal device and the network device is ensured, but also the consumption of energy of the terminal device is reduced.

By implementing this embodiment of the present disclosure, the network device may determine the antenna polarization information, and then perform the communication and transmission with the terminal device according to the antenna polarization information. In this way, not only the reliability of the communication and transmission between the terminal device and the network device is ensured, but also the consumption of energy of the terminal device is reduced.

Figure 8:
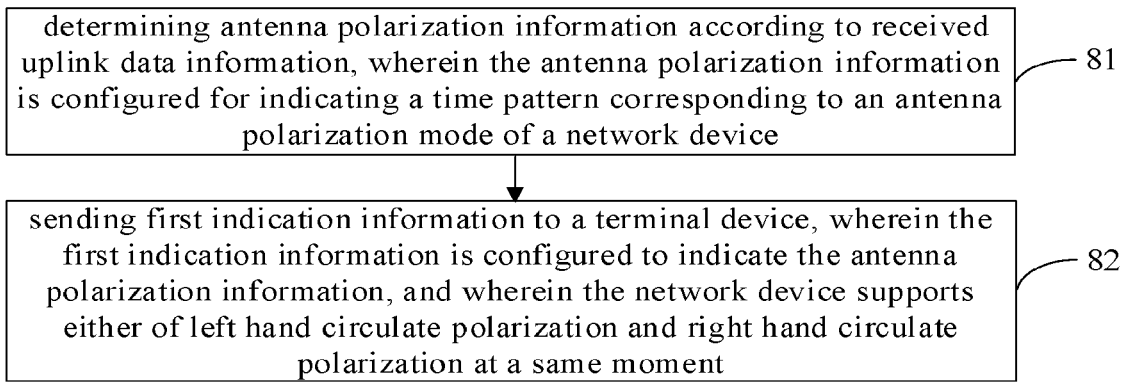
FIG. 8 is a flow diagram of a communication method provided by still another embodiment of the present disclosure.

Referring to FIG. 8, FIG. 8 is a flow diagram of a communication method provided by an embodiment of the present disclosure. This method is performed by a network device. As shown in FIG. 8, the method may include, but is not limited to, the following steps.

Step 81, determining antenna polarization information according to received uplink data information, wherein the antenna polarization information is configured for indicating a time pattern corresponding to an antenna polarization mode of the network device.

Optionally, the network device may determine a number of terminal devices corresponding to different antenna polarization modes according to the received uplink data information, and thereafter determine the antenna polarization information according to the number of terminal devices corresponding to the different antenna polarization modes, wherein the antenna polarization information is configured for indicating the time pattern corresponding to the antenna polarization mode of the network device.

There may be various types of uplink data information. For example, it may be physical random access channel (PRACH) information, physical uplink shared channel (PUSCH) information, and so on, without limitation of the present disclosure.

For example, when the antenna polarization mode corresponding to the network device is the left hand circulate polarization, the uplink data information received by the network device indicates "5"; and when the antenna polarization mode corresponding to the network device is the right hand circulate polarization, the uplink data information received by the network device indicates "20". It can be determined that the number of terminal devices whose antenna polarization mode is the left hand circulate polarization is 5, and the number of terminal devices whose antenna polarization mode is the right hand circulate polarization is 20. Thus, it can be determined that the time for the network device to support the left hand circulate polarization is shorter than the time for the network device to support the right hand circulate polarization, for example, the time for supporting the left hand circulate polarization may be 5 s, the time for supporting the right hand circulate polarization may be 20 s, and so on, and the present disclosure is not limited thereto.

Step 82, sending first indication information to a terminal device, wherein the first indication information is configured for indicating the antenna polarization information, and wherein the network device supports either of left hand circulate polarization and right hand circulate polarization at a same moment.

Optionally, the first indication information may be any one of: a synchronization signal block (SSB), system information, a random access message, and a media access control control element (MAC CE).

In the embodiments of the present disclosure, the antenna polarization mode of the network device may include the left hand circulate polarization and the right hand circulate polarization, but only one of the left hand circulate polarization and the right hand circulate polarization can be supported at the same moment. For example, if the network device supports the left hand circulate polarization mode at the moment t1, the first indication information may be sent to the terminal device to enable the terminal device to be informed that the antenna polarization mode of the network device at the moment t1 is the left hand circulate polarization, and so on, and the present disclosure is not limited thereto.

Optionally, the network device may send the first indication information to the terminal device to enable the terminal device to acquire the antenna polarization information of the network device, so that the terminal device and the network device can perform the communication and transmission during the time period in which the antenna polarization modes of the terminal device and the network device are consistent; while during the time period in which the antenna polarization modes of the terminal device and the network device are inconsistent, the terminal device and the network device cannot perform the communication and transmission, so the terminal device may be enabled to no longer monitor the network information. In this way, not only the reliability of the communication and transmission of the terminal device is ensured, but also the consumption of energy of the terminal device is reduced.

By implementing this embodiment of the present disclosure, the network device may determine a number of terminal devices corresponding to different antenna polarization modes according to the received uplink data information, and thereafter determine the antenna polarization information according to the number of terminal devices corresponding to the different antenna polarization modes, and send the first indication information to the terminal device so that the terminal device may be informed of the antenna polarization information of the network device. In this way, not only the reliability of the communication and transmission between the terminal device and the network device is ensured, but also the consumption of energy of the terminal device is reduced.

Figure 9:
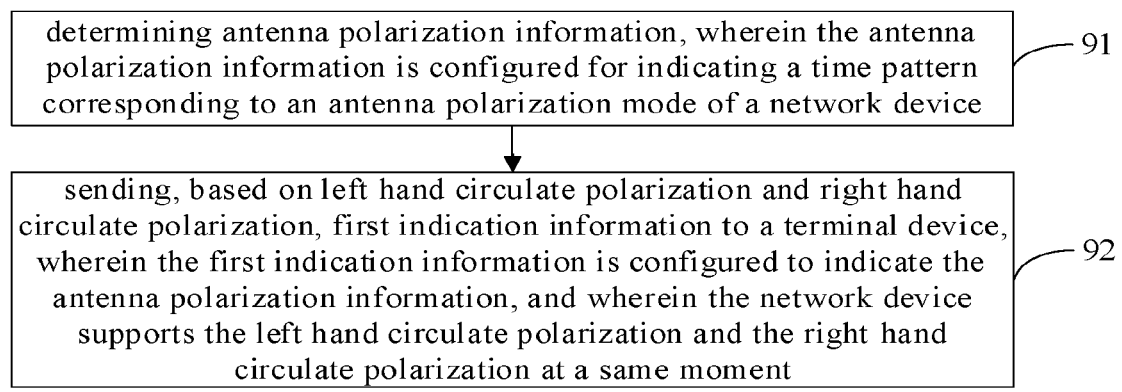
FIG. 9 is a flow diagram of a communication method provided by still another embodiment of the present disclosure.

Referring to FIG. 9, FIG. 9 is a flow diagram of a communication method provided by an embodiment of the present disclosure. This method is performed by a network device. As shown in FIG. 9, the method may include, but is not limited to, the following steps.

Step 91, determining antenna polarization information, wherein the antenna polarization information is configured for indicating a time pattern corresponding to an antenna polarization mode of the network device.

It is to be noted that the specific contents and realization of step 91 can be described with reference to the description of various other embodiments of the present disclosure and will not be repeated herein.

Step 92, sending, based on left hand circulate polarization and right hand circulate polarization, first indication information to a terminal device, wherein the first indication information is configured for indicating the antenna polarization information, and wherein the network device supports the left hand circulate polarization and the right hand circulate polarization at a same moment.

Optionally, the first indication information may include any one of: a synchronization signal block (SSB) and designated system information.

The designated system information may be a piece of or multiple pieces of predetermined system information. For example, it may be a master information block (MIB), or a system information block (SIB), etc., without limitation of the present disclosure.

In the embodiments of the present disclosure, the network device supports both the left hand circulate polarization and the right hand circulate polarization at the same moment. That is, when the network device sends the SSB or MIB to the terminal device by way of circular polarization, the SSB or MIB sent by the network device can be received, regardless of whether the antenna polarization mode of the terminal device is the left hand circulate polarization or the right hand circulate polarization, and thus, the terminal device can determine the antenna polarization information of the network device, and so on, and the present disclosure is not limited thereto.

Optionally, the network device may send the first indication information to the terminal device at a predetermined transmission power based on the left hand circulate polarization and the right hand circulate polarization.

The predetermined transmission power may be a transmission power that is set in advance in accordance with a protocol agreement. For example, if the predetermined transmission power is higher, the signal of the network device sending the first indication information is also stronger, thereby, ensuring the reliability of the communication and transmission between the terminal device and the network device.

Optionally, the network device may repeatedly send the first indication information to the terminal device based on the left hand circulate polarization and the right hand circulate polarization, which improves the reliability of the transmission of the first indication information.

Optionally, the network device may also send second indication information to the terminal device, wherein the second indication information is configured for indicating a repeated transmission mode of the first indication information, so that the terminal device is informed of the repeated transmission mode of the first indication information, which may cause the terminal device to receive the first indication information at a corresponding time, reducing the consumption of energy of the terminal device.

For example, the second indication information sent by the network device indicates that the first indication information is repeatedly sent every 30 seconds, so that the terminal device can be informed of the repeated transmission mode of the first indication information according to the indication of the second indication information, and so on, without limitation of the present disclosure.

Optionally, the network device may send the first indication information to the terminal device to enable the terminal device to acquire the antenna polarization information of the network device, so that the terminal device and the network device can perform the communication and transmission during the time period in which the antenna polarization modes of the terminal device and the network device are consistent; while during the time period in which the antenna polarization modes of the terminal device and the network device are inconsistent, the terminal device and the network device cannot perform the communication and transmission, so the terminal device may be enabled to no longer monitor the network information. In this way, not only the reliability of the communication and transmission of the terminal device is ensured, but also the consumption of energy of the terminal device is reduced.

By implementing this embodiment of the present disclosure, the network device may first determine the antenna polarization information, and thereafter send the first indication information to the terminal device based on the left hand circulate polarization and the right hand circulate polarization, so that the terminal device may be informed of the antenna polarization information of the network device. In this way, not only the reliability of the communication and transmission of the terminal device is ensured, but also the consumption of energy of the terminal device is reduced.

Figure 10:
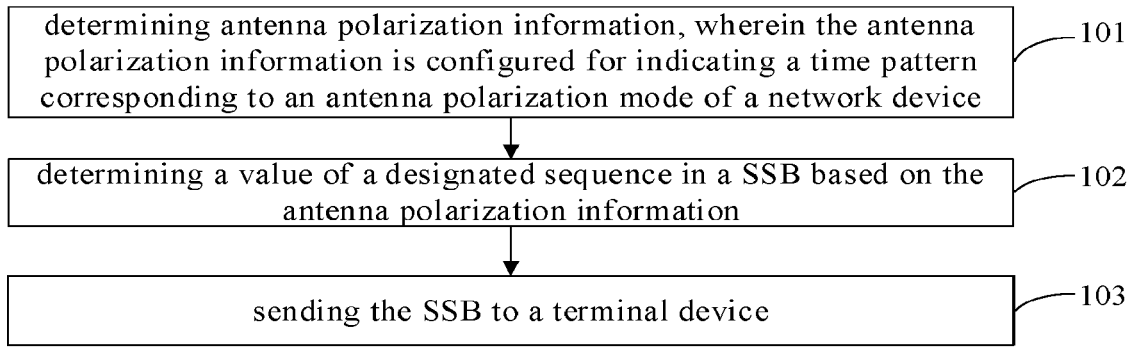
FIG. 10 is a flow diagram of a communication method provided by still another embodiment of the present disclosure.

Referring to FIG. 10, FIG. 10 is a flow diagram of a communication method provided by an embodiment of the present disclosure. This method is performed by a network device. As shown in FIG. 10, the method may include, but is not limited to, the following steps.

Step 101, determining antenna polarization information, wherein the antenna polarization information is configured for indicating a time pattern corresponding to an antenna polarization mode of the network device.

It is to be noted that the specific contents and realization of step 101 can be described with reference to the description of various other embodiments of the present disclosure and will not be repeated herein.

Step 102, determining a value of a designated sequence in a SSB based on the antenna polarization information.

For example, the corresponding relationship between the value of the designated sequence in the SSB and the antenna polarization information corresponding to the network device can be agreed in advance.

For example, it is agreed that a value of a designated sequence in the SSB may be set to 1 to characterize the antenna polarization mode of the network device as left hand circulate polarization; and a value of a designated sequence in the SSB may be set to 0 to characterize the antenna polarization mode of the network device as right hand circulate polarization. Thereby, if the antenna polarization mode of the network device during the current time period is the right hand circulate polarization, the value of the designated sequence in the SSB may be determined to be 0, etc., without limitation of the present disclosure.

Step 103, sending the SSB to the terminal device.

In the embodiments of the present disclosure, the network device may send the SSB to the terminal device after determining the value of the designated sequence in the SSB so that the terminal device may be informed of the antenna polarization information of the network device based on the value of the designated sequence in the SSB.

Optionally, the network device may also send the SSB to the terminal device to enable the terminal device to acquire the antenna polarization information of the network device, so that the terminal device and the network device can perform the communication and transmission during a time period in which the antenna polarization modes of the terminal device and the network device are consistent; while during a time period in which the antenna polarization modes of the terminal device and the network device are inconsistent, the terminal device and the network device cannot perform the communication and transmission, so the terminal device may be enabled to no longer monitor the network information. In this way, not only the reliability of the communication and transmission of the terminal device is ensured, but also the consumption of energy of the terminal device is reduced.

By implementing this embodiment of the present disclosure, the network device may first determine the antenna polarization information, and thereafter determine, based on the antenna polarization information, the value of the designated sequence in the SSB, so the network device can send the SSB to the terminal device to enable the terminal device to be informed of the antenna polarization information of the network device. In this way, not only the reliability of the communication and transmission of the terminal device is ensured, but also the consumption of energy of the terminal device is reduced.

In a first aspect, embodiments of the present disclosure provide a communication method, performed by a terminal device, the method including: determining antenna polarization information, wherein the antenna polarization information is configured for indicating a time pattern corresponding to an antenna polarization mode of a network device; and determining a communication transmission mode according to the antenna polarization information and an antenna polarization mode of the terminal device.

In this solution, the terminal device may first determine the antenna polarization information, and then determine the communication transmission mode according to the antenna polarization information and the antenna polarization mode of the terminal device, and perform communication and transmission. In this way, not only the reliability of the communication and transmission between the terminal device and the network device is ensured, but also the consumption of energy of the terminal device is reduced.

Optionally, determining the antenna polarization information includes: determining the antenna polarization information based on a protocol agreement; or determining the antenna polarization information according to first indication information; or determining the antenna polarization information according to a network information situation monitored during a first consecutive time period.

In this solution, the terminal device may, in a variety of ways, determine the antenna polarization information, which may make the ways of determining the antenna polarization information more flexible and diverse.

Optionally, the method further includes: receiving second indication information, wherein the second indication information is configured for indicating a repeated transmission mode of the first indication information.

In this solution, the terminal device may be informed of the repeated transmission mode of the first indication information by receiving the second indication information, so that the terminal device may receive the first indication information at the corresponding time, reducing the consumption of energy of the terminal device.

Optionally, determining the antenna polarization information according to the network information situation monitored during the first consecutive time period, includes: determining, in response to network information being monitored during the first consecutive time period, that the antenna polarization mode of the network device is the same as the antenna polarization mode of the terminal device; or determining, in response to no network information being monitored during the first consecutive time period, that the antenna polarization mode of the network device is different from the antenna polarization mode of the terminal device.

In this solution, the terminal device may also determine the antenna polarization information through the network information situation monitored during the first consecutive time period, which may make the ways of determining the antenna polarization information more flexible and diverse.

Optionally, determining that the antenna polarization mode of the network device is the same as the antenna polarization mode of the terminal device, includes: determining that the antenna polarization mode of the network device is the same as the antenna polarization mode of the terminal device during a time period in which the network information is monitored.

Optionally, the method further includes: disabling monitoring of the network information in response to the antenna polarization mode of the network device being different from the antenna polarization mode of the terminal device.

In this solution, the terminal device may stop monitoring the network information when it is determined that the antenna polarization mode of the network device is different from the antenna polarization mode of the terminal device, thereby reducing the consumption of energy of the terminal device.

Optionally, the first indication information is any one of: a synchronization signal block (SSB); system information; a random access message; or a media access control control element.

Optionally, the first indication information is the SSB, and determining the antenna polarization information according to the first indication information includes: determining the antenna polarization information according to a value of a designated sequence in the SSB.

Optionally, determining the communication transmission mode according to the antenna polarization information and the antenna polarization mode of the terminal device, includes: determining a communication transmission time pattern corresponding to the terminal device according to the time pattern corresponding to the antenna polarization mode of the network device and the antenna polarization mode of the terminal device; and performing communication and transmission with the network device based on the communication transmission time pattern corresponding to the terminal device.

In this solution, the terminal device may determine the corresponding communication transmission time pattern according to the antenna polarization information and the antenna polarization mode of the terminal device, and perform communication and transmission. In this way, not only the reliability of the communication and transmission between the terminal device and the network device is ensured, but also the consumption of energy of the terminal device is reduced.

In a second aspect, embodiments of the present disclosure provide another communication method, performed by a network device, the method including: determining antenna polarization information, wherein the antenna polarization information is configured for indicating a time pattern corresponding to an antenna polarization mode of the network device; and performing communication and transmission according to the antenna polarization information.

In this solution, the network device may first determine the antenna polarization information, and then perform communication and transmission with the terminal device according to the antenna polarization information. In this way, not only the reliability of the communication and transmission between the terminal device and the network device is ensured, but also the consumption of energy of the terminal device is reduced.

Optionally, determining the antenna polarization information includes: determining the antenna polarization information based on a protocol agreement; or determining the antenna polarization information according to received uplink data information.

In this solution, the network device may, in a variety of ways, determine the antenna polarization information, which may make the ways of determining the antenna polarization information more flexible and diverse.

Optionally, determining the antenna polarization information according to the received uplink data information includes: determining a number of terminal devices corresponding to different antenna polarization modes according to the received uplink data information; and determining the antenna polarization information according to the number of terminal devices corresponding to the different antenna polarization modes.

Optionally, performing communication and transmission according to the antenna polarization information includes: sending first indication information to a terminal device, wherein the first indication information is configured for indicating the antenna polarization information, and wherein the network device supports either of left hand circulate polarization and right hand circulate polarization at a same moment.

In this solution, the network device may reduce the consumption of energy of the terminal device by sending the first indication information to the terminal device so that the terminal device is informed of the antenna polarization information.

Optionally, performing communication and transmission according to the antenna polarization information includes: sending, based on left hand circulate polarization and right hand circulate polarization, first indication information to a terminal device, wherein the network device supports the left hand circulate polarization and the right hand circulate polarization at a same moment.

In this solution, the network device may reduce the consumption of energy of the terminal device by sending the first indication information to the terminal device so that the terminal device is informed of the antenna polarization information.

Optionally, the first indication information includes any one of: a synchronization signal block (SSB) and designated system information.

Optionally, sending the first indication information to the terminal device based on the left hand circulate polarization and the right hand circulate polarization, includes: sending, based on the left hand circulate polarization and the right hand circulate polarization, the first indication information to the terminal device at a predetermined transmission power; or repeatedly sending, based on the left hand circulate polarization and the right hand circulate polarization, the first indication information to the terminal device.

In this solution, the network device may reduce the consumption of energy by the terminal device by repeatedly sending the first indication information to the terminal device so that the terminal device is informed of the antenna polarization information.

Optionally, the method further includes: sending second indication information to the terminal device, wherein the second indication information is configured for indicating a repeated transmission mode of the first indication information.

In this solution, the network device may reduce the consumption of energy of the terminal device by sending the second indication information to the terminal device so that the terminal device is informed of the repeated transmission mode of the first indication information, which may cause the terminal device to receive the first indication information at a corresponding time.

Optionally, the first indication information is a SSB, and the method further includes: determining a value of a designated sequence in the SSB based on the antenna polarization information.

Optionally, the first indication information is any one of: a synchronization signal block (SSB); system information; a random access message; or a media access control control element.

In a third aspect, the present disclosure provides a communication device that has some or all of the functions of the terminal device implementing the method described in the first aspect above. For example, the function of the communication device may have the functions of implementing some or all embodiments of the present disclosure, or may have the function of independently implementing any one of the embodiments of the present disclosure. The functions described can be implemented by hardware, or can be implemented by hardware executing corresponding software. The hardware or software includes one or more units or modules corresponding to the above functions.

In an embodiment, the communication device may include in its structure a transceiver module and a processing module, the processing module being configured to support the communication device in performing the corresponding functions in the method described above. The transceiver module is configured to support communication between the communication device and other devices. The communication device may further include a storage module. The storage module is configured to couple with the transceiver module and the processing module, which holds the necessary computer programs and data of the communication device.

For example, the processing module may be a processor, the transceiver module may be a transceiver or a communication interface, and the storage module may be a memory.

The communication device provided in the present disclosure may first determine the antenna polarization information, and then determine the communication transmission mode according to the antenna polarization information and the antenna polarization mode of the device, and perform communication and transmission. In this way, not only the reliability of the communication and transmission between the terminal device and the network device is ensured, but also the consumption of energy of the terminal device is reduced.

In a fourth aspect, embodiments of the present disclosure provide another communication device having some or all of the functions of the network device implementing the method embodiments described in the second aspect above. For example, the function of the communication device may have the functions of implementing some or all embodiments of the present disclosure, or may have the function of independently implementing any one of the embodiments of the present disclosure. The functions described can be implemented by hardware, or can be implemented by hardware executing corresponding software. The hardware or software includes one or more units or modules corresponding to the above functions.

In an embodiment, the communication device may include in its structure a transceiver module and a processing module, the processing module being configured to support the communication device in performing the corresponding functions in the method described above. The transceiver module is configured to support communication between the communication device and other devices. The communication device may further include a storage module. The storage module is configured to couple with the transceiver module and the processing module, which holds the necessary computer programs and data of the communication device.

For example, the processing module may be a processor, the transceiver module may be a transceiver or a communication interface, and the storage module may be a memory.

The communication device provided in the present disclosure may first determine the antenna polarization information, and then perform communication and transmission with the terminal device according to the antenna polarization information. In this way, not only the reliability of the communication and transmission of the terminal device is ensured, but also the consumption of energy of the terminal device is reduced.

In a fifth aspect, embodiments of the present disclosure provide a communication device including a processor that performs the method described in the first aspect above when the processor calls a computer program in a memory.

In a sixth aspect, embodiments of the present disclosure provide a communication device including a processor that performs the method described in the second aspect above when the processor calls a computer program in a memory.

In a seventh aspect, embodiments of the present disclosure provide a communication device including a processor and a memory in which a computer program is stored. The processor executes the computer program stored in the memory to perform the method described in the first aspect.

In an eighth aspect, embodiments of the present disclosure provide a communication device including a processor and a memory in which a computer program is stored. The processor executes the computer program stored in the memory to perform the method described in the second aspect.

In a ninth aspect, embodiments of the present disclosure provide a communication device including a processor and an interface circuit configured to receive one or more code instructions and transmit the one or more code instructions to the processor. The processor is configured to execute the one or more code instructions to cause the device to perform the method described in the first aspect above.

In a tenth aspect, embodiments of the present disclosure provide a communication device including a processor and an interface circuit configured to receive one or more code instructions and transmit the one or more code instructions to the processor. The processor is configured to execute the one or more code instructions to cause the device to perform the method described in the second aspect above.

In an eleventh aspect, embodiments of the present disclosure provide a communication system including the communication device described in the third aspect and the communication device described in the fourth aspect, or, alternatively, the communication device described in the fifth aspect and the communication device described in the sixth aspect, or, alternatively, the communication device described in the seventh aspect and the communication device described in the eighth aspect, or, alternatively, the communication device described in the ninth aspect and the communication device described in the tenth aspect.

In a twelfth aspect, embodiments of the present disclosure provide a computer-readable storage medium configured to store one or more instructions for use by the terminal device, which, when the one or more instructions are executed, cause the method described in the first aspect above to be realized.

In a thirteenth aspect, embodiments of the present disclosure provide a computer-readable storage medium configured to store one or more instructions for use by the network device, which, when the one or more instructions are executed, cause the method described in the second aspect above to be realized.

In a fourteenth aspect, the present disclosure further provides a computer program product including a computer program that, when run on a computer, causes the computer to perform the method described in the first aspect above.

In a fifteenth aspect, the present disclosure further provides a computer program product including a computer program that, when run on a computer, causes the computer to perform the method described in the second aspect above.

In a sixteenth aspect, the present disclosure provides a chip system including at least one processor and an interface for supporting the terminal device in realizing the functions involved in the first aspect, for example, determining or processing at least one of the data and information involved in the method described above. In one possible design, the chip system further includes a memory configured to store the necessary computer programs and data of the terminal device. The chip system may be composed of chips or may include a chip and other discrete devices.

In a seventeenth aspect, the present disclosure provides a chip system including at least one processor and an interface for supporting the network device in realizing the functions involved in the second aspect, for example, determining or processing at least one of the data and information involved in the method described above. In one possible design, the chip system further includes a memory configured to store the necessary computer programs and data of the terminal device. The chip system may be composed of chips or may include a chip and other discrete devices.

In an eighteenth aspect, the present disclosure provides a computer program that, when run on a computer, causes the computer to perform the method described in the first aspect above.

In a nineteenth aspect, the present disclosure provides a computer program that, when run on a computer, causes the computer to perform the method described in the second aspect above.

In the above-described embodiments provided in the present disclosure, the methods provided by the embodiments of the present disclosure are described from the perspectives of a network device and a terminal device, respectively. In order to realize each of the functions in the methods provided by the above embodiments of the present disclosure, the network device and the terminal device may include a hardware structure, a software module, and realize each of the above functions in the form of the hardware structure, the software module, or the combination of the hardware structure and the software module. One of the above-described functions may be performed in the form of a hardware structure, a software module, or a combination of a hardware structure and a software module.

Figure 11:
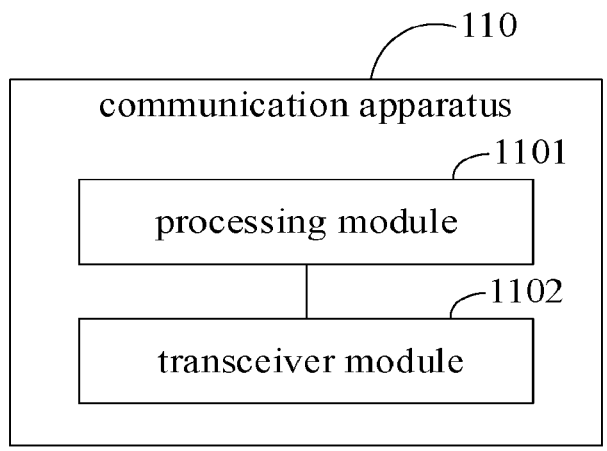
FIG. 11 is a schematic diagram of a structure of a communication apparatus of an embodiment of the present disclosure.

Referring to FIG. 11 which is a schematic diagram of a structure of a communication apparatus 110 provided by embodiments of the present disclosure, the communication apparatus 110 shown in FIG. 11 may include a processing module 1101 and a transceiver module 1102.

The transceiver module 1102 may include a transmitting module and/or a receiving module, the transmitting module is configured to realize a transmitting function, and the receiving module is configured to realize a receiving function, so the transceiver module 1102 may realize a transmitting function and/or a receiving function.

It is to be understood that the communication apparatus 110 may be a terminal device, a device in a terminal device, or a device capable of being used in conjunction with a terminal device.

The communication apparatus 110 includes the processing module 1101 configured to determine antenna polarization information, wherein the antenna polarization information is configured to indicate a time pattern corresponding to an antenna polarization mode of a network device.

The processing module 1101 is further configured to determine a communication transmission mode according to the antenna polarization information and an antenna polarization mode of the apparatus.

Optionally, the processing module 1101 is specifically configured to determine the antenna polarization information based on a protocol agreement; or determine the antenna polarization information according to first indication information; or determine the antenna polarization information according to a network information situation monitored during a first consecutive time period Optionally, the communication apparatus 110 further includes: the transceiver module 1102 configured to receive second indication information, wherein the second indication information is configured for indicating a repeated transmission mode of the first indication information.

Optionally, the processing module 1101 is specifically configured to: determine, in response to network information being monitored during the first consecutive time period, that the antenna polarization mode of the network device is the same as the antenna polarization mode of the apparatus; or determine, in response to no network information being monitored during the first consecutive time period, that the antenna polarization mode of the network device is different from the antenna polarization mode of the terminal device.

Optionally, the processing module 1101 is further specifically configured to determine that the antenna polarization mode of the network device is the same as the antenna polarization mode of the apparatus during a time period in which the network information is monitored.

Optionally, the transceiver module 1102 is further configured to disable monitoring of the network information in response to the antenna polarization mode of the network device being different from the antenna polarization mode of the apparatus.

Optionally, the first indication information is any one of: a synchronization signal block (SSB); system information; a random access message; or a media access control control element.

Optionally, the first indication information is the SSB, and the processing module 1101 is further specifically configured to determine the antenna polarization information according to a value of a designated sequence in the SSB.

Optionally, the processing module 1101 is further specifically configured to determine a communication transmission time pattern corresponding to the apparatus according to the time pattern corresponding to the antenna polarization mode of the network device and the antenna polarization mode of the apparatus.

The transceiver module 1102 is further configured to perform communication and transmission with the network device based on the communication transmission time pattern corresponding to the apparatus.

The communication apparatus provided in the present disclosure may first determine the antenna polarization information, and thereafter, based on the antenna polarization information and the antenna polarization mode of the apparatus, determine the communication transmission mode, and perform the communication and transmission. In this way, not only the reliability of the communication and transmission between the terminal device and the network device is ensured, but also the consumption of energy of the terminal device is reduced.

It is to be understood that the communication apparatus 110 may be a network device, a device in a network device, or a device capable of being used in conjunction with a network device.

The communication apparatus 110 includes: a processing module 1101 configured to determine antenna polarization information, wherein the antenna polarization information is configured for indicating a time pattern corresponding to an antenna polarization mode of the network device; and a transceiver module 1102 configured to perform communication and transmission according to the antenna polarization information.

Optionally, the processing module 1101 is specifically configured to: determine the antenna polarization information based on a protocol agreement; or determine the antenna polarization information according to received uplink data information.

Optionally, the processing module 1101 is further specifically configured to: determine a number of terminal devices corresponding to different antenna polarization modes according to the received uplink data information; and determine the antenna polarization information according to the number of terminal devices corresponding to the different antenna polarization modes.

Optionally, the transceiver module 1102 is specifically configured to send first indication information to a terminal device, wherein the first indication information is configured for indicating the antenna polarization information, and wherein the network device supports either of left hand circulate polarization and right hand circulate polarization at a same moment.

Optionally, the transceiver module 1102 is further specifically configured to send, based on left hand circulate polarization and right hand circulate polarization, first indication information to a terminal device, wherein the network device supports the left hand circulate polarization and the right hand circulate polarization at a same moment.

Optionally, the first indication information includes any one of: a synchronization signal block (SSB) and designated system information.

Optionally, the transceiver module 1102 is further specifically configured to: send, based on the left hand circulate polarization and the right hand circulate polarization, the first indication information to the terminal device at a predetermined transmission power; or repeatedly send, based on the left hand circulate polarization and the right hand circulate polarization, the first indication information to the terminal device.

Optionally, the transceiver module 1102 is further configured to send second indication information to the terminal device, wherein the second indication information is configured for indicating a repeated transmission mode of the first indication information.

Optionally, the first indication information is a SSB, and the processing module 1101 is further configured to determine a value of a designated sequence in the SSB based on the antenna polarization information.

Optionally, the first indication information is any one of: a synchronization signal block (SSB); system information; a random access message; or a media access control control element.

The present disclosure provides the communication apparatus that may first determine the antenna polarization information, and thereafter perform the communication and transmission with the terminal device according to the antenna polarization information. In this way, not only the reliability of the communication and transmission of the terminal device is ensured, but also the consumption of energy of the terminal device is reduced.

Figure 12:
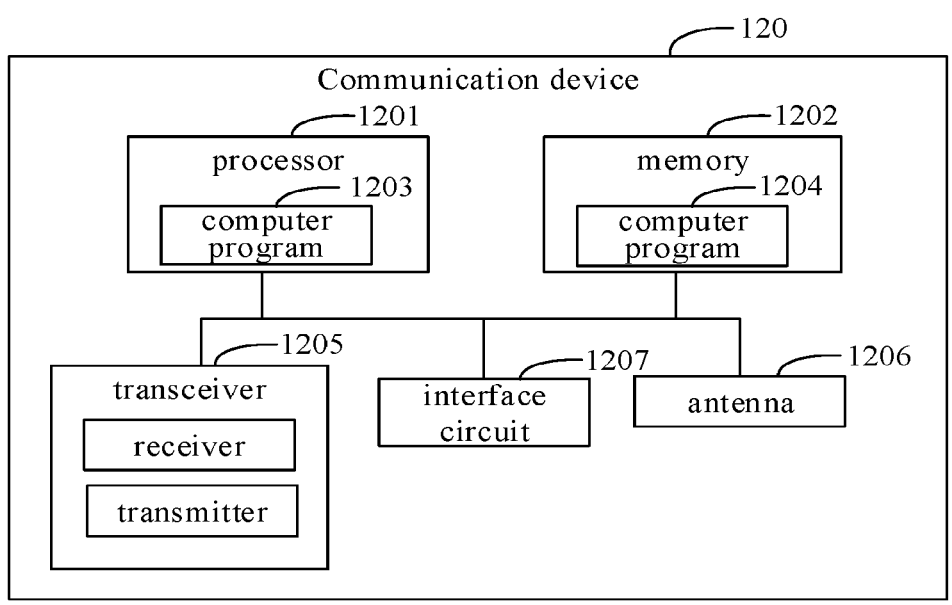
FIG. 12 is a schematic diagram of a structure of a communication device of another embodiment of the present disclosure.

Referring to FIG. 12, FIG. 12 is a schematic diagram of a structure of a communication device 120 provided by embodiments of the present disclosure. The communication device 120 may be a network device, a terminal device, a chip, a chip system, or a processor, etc. that supports the network device to realize the above-described method, or a chip, a chip system, or a processor, etc. that supports the terminal device to realize the above-described method. The device may be used to realize the methods described in the above-described method embodiments, as may be described in the above-described method embodiments.

The communication device 120 may include one or more processors 1201. The processor 1201 may be a general purpose processor or a specialized processor, etc., for example, it may be a baseband processor or a central processor. The baseband processor may be used for processing communication protocols as well as communication data, and the central processor may be used for controlling the communication device (e.g., base station, baseband chip, terminal device, terminal device chip, DU or CU, etc.), executing a computer program, and processing data of the computer program.

Optionally, one or more memories 1202 may also be included in the communication device 120 on which a computer program 1204 may be stored, and the processor 1201 executes the computer program 1204 to cause the communication device 120 to perform the methods described in the above method embodiments.

Optionally, data may also be stored in the memory 1202. The communication device 120 and the memory 1202 may be provided separately or may be integrated together.

Optionally, the communication device 120 may further include a transceiver 1205, an antenna 1206. The transceiver 1205 may be referred to as a transceiver unit, a transceiver machine, or a transceiver circuit, etc., for realizing the transceiver function. The transceiver 1205 may include a receiver and a transmitter, the receiver may be referred to as a receiver machine or a receiving circuit, etc., for realizing the receiving function, and the transmitter may be referred to as a transmitter machine or a transmitting circuit, etc., for realizing the transmitting function.

Optionally, one or more interface circuits 1207 may also be included in the communication device 120. The interface circuit 1207 is used to receive code instructions and transmit them to the processor 1201. The processor 1201 runs the code instructions to cause the communication device 120 to perform the methods described in the method embodiments above.

When the communication device 120 is a terminal device, the processor 1201 is used to perform step 21 in FIG. 2, step 22 in FIG. 2, step 31 in FIG. 3, step 33 in FIG. 3, step 41 in FIG. 4, step 42 in FIG. 4, step 51 in FIG. 5, step 61 in FIG. 6, or step 62 in FIG. 6; and the transceiver 1205 is used to perform step 32 in FIG. 2, step 52 in FIG. 5, or step 63 in FIG. 6.

When the communication device 120 is a network device, the processor 1201 is used to perform step 71 in FIG. 7, step 81 in FIG. 8, step 91 in FIG. 9, step 101 in FIG. 10, or step 102 in FIG. 10; and the transceiver 1205 is used to perform step 72 in FIG. 7, step 82 in FIG. 8, step 92 in FIG. 9, or step 103 in FIG. 10.

In one embodiment, the processor 1201 may include a transceiver for implementing the receiving and transmitting functions. The transceiver may be, for example, a transceiver circuit, or an interface, or an interface circuit. The transceiver circuit, interface, or interface circuit for implementing the receiving and transmitting functions may be separate or may be integrated together. The transceiver circuit, interface, or interface circuit described above may be used for code/data reading and writing, or, the transceiver circuit, interface, or interface circuit described above may be used for signal transmission or delivery.

In one embodiment, the processor 1201 may hold a computer program 1203, which runs on the processor 1201 and may cause the communication device 120 to perform the methods described in the method embodiments above. The computer program 1203 may be solidified in the processor 1201, in which case the processor 1201 may be implemented by hardware.

In one embodiment, the communication device 120 may include a circuit, and the circuit may implement the functions of sending or receiving or communicating in the preceding method embodiments. The processors and transceivers described in this disclosure may be implemented on integrated circuits (ICs), analog ICs, radio frequency integrated circuits (RFICs), mixed signal ICs, application specific integrated circuits (ASICs), printed circuit boards (PCBs), electronic equipment, etc. The processor and transceiver may also be fabricated using various IC process technologies, such as complementary metal oxide semiconductor (CMOS), N-type metal-oxide-semiconductor (NMOS), positive channel metal oxide semiconductors (PMOS), and bipolar junction transistor (BJT), Bipolar CMOS (BiCMOS), Silicon Germanium (SiGe), Gallium Arsenide (GaAs) and so on.

The communication device in the above description of embodiments may be a network device or a terminal device, but the scope of the communication device described in the present disclosure is not limited thereto, and the structure of the communication device may not be limited by FIG. 12. The communication device may be a stand-alone device or may be part of a larger device. For example the described communication device may be:
 (1) A stand-alone integrated circuit IC, or chip, or, system-on-a-chip or subsystem.
 (2) A collection including one or more ICs, optionally, the collection of ICs may also include storage components for storing data and computer programs.
 (3) An ASIC, such as a modem.
 (4) A module that can be embedded in other equipment.
 (5) A receiver, terminal device, intelligent terminal device, cellular phone, wireless device, handheld, mobile unit, in-vehicle device, network device, cloud device, artificial intelligence device, and so on.
 (6) Others, etc.

Figure 13:
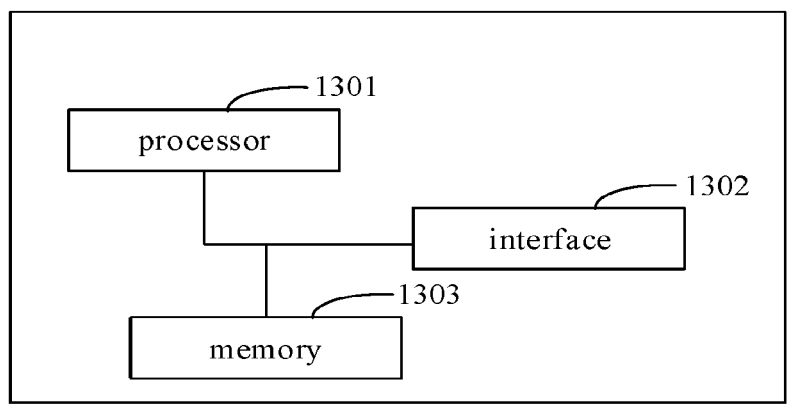
FIG. 13 is a schematic diagram of a structure of a chip of an embodiment of the present disclosure.

For the case where the communication device may be a chip or a system-on-a-chip, please refer to the schematic diagram of a structure of a chip shown in FIG. 13. The chip shown in FIG. 13 includes a processor 1301 and an interface 1302. There may be one or more processors 1301, and one or more interfaces 1302.

For the case where the chip is used to implement the functions of the terminal device in the embodiments of the present disclosure: the interface 1302 is configured to perform step 32 in FIG. 2, step 52 in FIG. 5, or step 63 in FIG. 6.

For the case where the chip is used to implement the functions of the network device in the embodiments of the present disclosure: the interface 1302 is configured to perform step 72 in FIG. 7, step 82 in FIG. 8, step 92 in FIG. 9, or step 103 in FIG. 10.

Optionally, the chip further includes a memory 1303, the memory 1303 being configured to store necessary computer programs and data.

It is also appreciated by those skilled in the art that the various illustrative logical blocks and steps listed in embodiments of the present disclosure may be implemented by electronic hardware, computer software, or a combination thereof. Whether such functionality is implemented in hardware or software depends on the specific application and overall system design requirements. Those skilled in the art may use various methods to implement the described functionality for each particular application, but such implementations should not be construed as being beyond the scope of protection of the embodiments of the present disclosure.

Embodiments of the present disclosure also provide a communication system including a communication device as a terminal device and a communication device as a network device in the preceding embodiment of FIG. 11, or, alternatively, the system includes a communication device as a terminal device and a communication device as a network device in the preceding embodiment of FIG. 12.

The present disclosure also provides a computer-readable storage medium having stored thereon instructions which, when executed by a computer, realize the functions of any of the method embodiments described above.

The present disclosure also provides a computer program product that, when executed by a computer, implements the functionality of any of the method embodiments described above.

The above embodiments may be implemented in whole or in part by software, hardware, firmware, or any combination thereof. When implemented using software, it may be implemented, in whole or in part, in the form of a computer program product. The computer program product includes one or more computer programs. Loading and executing the computer program on a computer produces, in whole or in part, a process or function in accordance with embodiments of the present disclosure. The computer may be a general purpose computer, a specialized computer, a computer network, or other programmable device. The computer program may be stored in a computer-readable storage medium or transmitted from one computer-readable storage medium to another computer-readable storage medium, e.g., the computer program may be transmitted from a web site, computer, server, or data center via a wired (e.g., coaxial cable, fiber optic, digital subscriber line (DSL)) or wireless (e.g., infrared, wireless, microwave, etc.) to another website site, computer, server, or data center. The computer-readable storage medium may be any usable medium to which a computer has access or a data storage device such as a server, data center, etc. containing one or more usable medium integrated. The usable medium may be a magnetic medium (e.g., floppy disk, hard disk, tape), an optical medium (e.g., a high-density digital video disc (DVD)), or a semiconductor medium (e.g., a solid state disk (SSD)), among others.

A person of ordinary skill in the art may understand that the first, second, and other various numerical numbers involved in the present disclosure are only described for the convenience of differentiation, and are not intended to limit the scope of the embodiments of the present disclosure, nor are they intended to indicate the order of precedence.

The term "at least one" in the present disclosure may also be described as one or more, and the plurality may be two, three, four, or more, without limitation of the present disclosure. In embodiments of the present disclosure, for a kind of technical features, technical features of this kind of technical features are described using "first", "second", "third", "A", "B", "C", and "D", etc., for distinction, and there is no order of priority or size among these technical features described by the "first", "second", "third", "A", "B", "B", "C" and "D".

The corresponding relationships or correspondences shown in the tables in this disclosure may be configured or may be predefined. The values of the information in the respective tables are merely examples and may be configured to other values, which are not limited by the present disclosure. In configuring the correspondence between the information and the respective parameters, it is not necessarily required that all of the correspondences illustrated in the respective tables must be configured. For example, the correspondences illustrated in certain rows of the tables in the present disclosure may also not be configured. For another example, the above tables may be adjusted by appropriate distortions, such as splitting, merging, and the like. The names of the parameters shown in the headings in the above-described tables may also be other names understandable in the communication device, and the values or representations of the parameters thereof may also be other values or representations understandable in the communication device. The above tables may also be realized using other data structures, such as arrays, queues, containers, stacks, linear tables, pointers, chain lists, trees, graphs, structures, classes, heaps, or hash tables.

The term "predetermined/preset/predefined" in this disclosure may be understood as defined, pre-defined, stored, pre-stored, pre-negotiated, pre-configured, cured, or pre-fired.

Those of ordinary skill in the art may understand that the units and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of the technical solution. The skilled professional may use different methods to implement the described functions for each particular application, but such implementations should not be considered beyond the scope of the present disclosure.

It is clearly understood by those skilled in the art to which it belongs that, for the convenience and brevity of the description, the specific working processes of the above-described systems, apparatuses, and units can be referred to the corresponding processes in the foregoing embodiments of the method, and will not be repeated herein.

The foregoing are only specific embodiments of the present disclosure, but the scope of protection of the present disclosure is not limited thereto. Any person skilled in the art who is familiar with the technical field can readily think of changes or substitutions within the technical scope disclosed in the present disclosure which should be covered by the scope of protection of the present disclosure. Therefore, the scope of protection of the present disclosure should be subject to the scope of protection of the claims.

What is claimed is:

1. A communication method, comprising:
   determining, by a terminal device, antenna polarization information, wherein the antenna polarization information is configured for indicating a time pattern corresponding to an antenna polarization mode of a network device; and
   determining, by the terminal device, a communication transmission mode according to the antenna polarization information and an antenna polarization mode of the terminal device.

2. The method of claim 1, wherein determining the antenna polarization information comprises:
   determining the antenna polarization information based on a protocol agreement; or
   determining the antenna polarization information according to first indication information; or
   determining the antenna polarization information according to a network information situation monitored during a first consecutive time period.

3. The method of claim 2, further comprising:
receiving second indication information, wherein the second indication information is configured for indicating a repeated transmission mode of the first indication information.

4. The method of claim 2, wherein determining the antenna polarization information according to the network information situation monitored during the first consecutive time period, comprises:
determining, in response to network information being monitored during the first consecutive time period, that the antenna polarization mode of the network device is the same as the antenna polarization mode of the terminal device; or
determining, in response to no network information being monitored during the first consecutive time period, that the antenna polarization mode of the network device is different from the antenna polarization mode of the terminal device.

5. The method of claim 4, wherein determining that the antenna polarization mode of the network device is the same as the antenna polarization mode of the terminal device, comprises:
determining that the antenna polarization mode of the network device is the same as the antenna polarization mode of the terminal device during a time period in which the network information is monitored.

6. The method of claim 4, further comprising:
disabling monitoring of the network information in response to determining that the antenna polarization mode of the network device is different from the antenna polarization mode of the terminal device.

7. The method of claim 2, wherein the first indication information is any one of:
a synchronization signal block (SSB);
system information;
a random access message; or
a media access control control element.

8. The method of claim 7, wherein the first indication information is the SSB, and determining the antenna polarization information according to the first indication information, comprising:
determining the antenna polarization information according to a value of a designated sequence in the SSB.

9. The method of claim 1, wherein determining the communication transmission mode according to the antenna polarization information and the antenna polarization mode of the terminal device, comprises:
determining a communication transmission time pattern corresponding to the terminal device according to the time pattern corresponding to the antenna polarization mode of the network device and the antenna polarization mode of the terminal device; and
performing communication and transmission with the network device based on the communication transmission time pattern corresponding to the terminal device.

10. A communication method, comprising:
determining, by a network device, antenna polarization information, wherein the antenna polarization information is configured for indicating a time pattern corresponding to an antenna polarization mode of the network device; and
performing, by the network device, communication and transmission according to the antenna polarization information.

11. The method of claim 10, wherein determining the antenna polarization information comprises:
determining the antenna polarization information based on a protocol agreement; or
determining the antenna polarization information according to received uplink data information.

12. The method of claim 11, wherein determining the antenna polarization information according to the received uplink data information, comprises:
determining a number of terminal devices corresponding to different antenna polarization modes according to the received uplink data information; and
determining the antenna polarization information according to the number of terminal devices corresponding to the different antenna polarization modes.

13. The method of claim 10, wherein performing communication and transmission according to the antenna polarization information, comprises:
sending first indication information to a terminal device, wherein the first indication information is configured for indicating the antenna polarization information, and the antenna polarization information is configured for indicating that the network device supports either of left hand circulate polarization and right hand circulate polarization at a same moment.

14. The method of claim 10, wherein performing communication and transmission according to the antenna polarization information, comprises:
sending, based on left hand circulate polarization and right hand circulate polarization, first indication information to a terminal device, wherein the first indication information is configured for indicating the antenna polarization information, and the antenna polarization information is configured for indicating that the network device supports the left hand circulate polarization and the right hand circulate polarization at a same moment.

15. The method of claim 14, wherein the first indication information comprises any one of: a synchronization signal block (SSB) and designated system information.

16. The method of claim 14, wherein sending the first indication information to the terminal device based on the left hand circulate polarization and the right hand circulate polarization, comprises:
sending, based on the left hand circulate polarization and the right hand circulate polarization, the first indication information to the terminal device at a predetermined transmission power; or
repeatedly sending, based on the left hand circulate polarization and the right hand circulate polarization, the first indication information to the terminal device.

17. The method of claim 16, further comprising:
sending second indication information to the terminal device, wherein the second indication information is configured for indicating a repeated transmission mode of the first indication information.

18. The method of claim 14, wherein the first indication information is a SSB, the method further comprising:
determining a value of a designated sequence in the SSB based on the antenna polarization information.

19. The method of claim 14, wherein the first indication information is any one of:
a synchronization signal block (SSB);
system information;
a random access message; or
a media access control control element.

20. A communication device, comprising:
a processor; and
a memory including instructions executable by the processor,
wherein the processor is configured to:
    determine antenna polarization information, wherein the antenna polarization information is configured for indicating a time pattern corresponding to an antenna polarization mode of a network device; and
    determine a communication transmission mode according to the antenna polarization information and an antenna polarization mode of the communication device.

* * * * *